United States Patent
Hohensee et al.

[11] Patent Number: 5,778,211
[45] Date of Patent: Jul. 7, 1998

[54] EMULATING A DELAYED EXCEPTION ON A DIGITAL COMPUTER HAVING A CORRESPONDING PRECISE EXCEPTION MECHANISM

[75] Inventors: Paul H. Hohensee, Nashua, N.H.; David Dice, Foxboro, Mass.

[73] Assignee: Sun Microsystems, Inc., Mountain View, Calif.

[21] Appl. No.: 602,158

[22] Filed: Feb. 15, 1996

[51] Int. Cl.$^6$ .................................. G06F 9/00; G06F 9/46
[52] U.S. Cl. ............................ 395/500; 395/527; 395/595
[58] Field of Search ................................. 395/500, 375, 395/527, 595–598, 559, 561, 563

[56] References Cited

U.S. PATENT DOCUMENTS

| | | | |
|---|---|---|---|
| 5,113,521 | 5/1992 | McKeen et al. | 395/182.13 |
| 5,197,138 | 3/1993 | Hobbs et al. | 395/375 |
| 5,237,700 | 8/1993 | Johnson et al. | 395/591 |
| 5,406,644 | 4/1995 | MacGregor | 395/500 |

*Primary Examiner*—Emanuel Todd Voeltz
*Assistant Examiner*—Vuthe Siek
*Attorney, Agent, or Firm*—Richard A. Jordan

[57] ABSTRACT

A digital computer system comprises a precise exception handling processor and a control subsystem. The precise exception handling processor performs processing operations under control of instructions. The precise exception handling processor is constructed in accordance with a precise exception handling model, in which, if an exception condition is detected in connection with an instruction, the exception condition is processed in connection with the instruction. The precise exception handling processor further includes a pending exception indicator having a pending exception indication state and a no pending exception indication state. The control subsystem provides a series of instructions to the precise exception handling processor to facilitate emulation of at least one emulated program instruction. The emulated program instruction is constructed to be processed by a delayed exception handling processor which is constructed in accordance with a delayed exception handling model, in which if an exception is detected during processing of an instruction, the exception condition is processed in connection with a subsequent instruction. The series of instructions provided by the control subsystem in emulation of the emulated program instruction controls the precise exception handling processor to (i) determine whether the pending exception indicator is in the pending exception indication state and, if so, to invoke a routine to process the pending exception and condition the pending exception indicator to the no pending exception indication state (ii) perform processing operations in accordance with the emulated processing instruction; and (iii) if an exception condition is detected during the processing operations, to invoke an exception handler in accordance with the processor's precise exception handling model to condition the pending exception indicator to the pending exception indication state, so that the exception condition will be processed during processing operations for a subsequent emulated program instruction.

83 Claims, 4 Drawing Sheets

5,778,211

EMULATING A DELAYED EXCEPTION ON A DIGITAL COMPUTER HAVING A CORRESPONDING PRECISE EXCEPTION MECHANISM

FIELD OF THE INVENTION

The invention relates generally to the field of digital computers, and more particularly to emulating a delayed exception handling mechanism on a digital computer which has a precise exception handling mechanism.

BACKGROUND OF THE INVENTION

Digital computers process a variety of diverse types of programs, with each program including a series of instructions that enable the computer to perform specific operations in connection with specific elements of data. A variety of types of processors are available for use in digital computer systems, with each type of processor being constructed in accordance with an architecture which describes, inter alia, the set of instructions that a processor constructed in accordance with the architecture is expected to execute, the format(s) of the various instructions, the types and formats of data which may be processed, definitions for various registers that may be used during instruction processing, how information in the computer's memory will be accessed and how a processor constructed in accordance with the architecture is to handle exception conditions which may be detected during instruction processing.

It is often desirable to enable one type of processor, as an "emulated processor," to be emulated by another type of processor, as a "host processor." A host processor generally emulates an emulated processor by processing programs which have been written for the emulated processor, to generate an output that effectively corresponds to the output that would be generated by the emulated processor. Generally, emulation is accomplished by translating a program generated for execution by an emulated processor (an "original" program) into a program which may be processed by a host processor (a "translated" program). This translation process may include, for example, generating from instructions and other elements of the original program, instructions and other elements which are based on the host processor's architecture thereby to provide the translated program. The translation may be performed by, for example, the host processor itself, by another processor in the same computer system or by another computer system and made available to the host processor which is to process the program, under control of a translation program. In performing the translation, each instruction or sequences or various groups of instructions in the original program (that is, the program based on the emulated processor's architecture) may be translated into one or a series or group of instructions for processing by the host processor. The translation process is typically performed for all or selected portions of an original program when the processor begins processing the original program, although it will be appreciated that an instruction or group of instructions of the original program may be translated as the processing proceeds. In addition, if the emulated processor's data formats are not directly useable by the host processor, the data may be processed to convert it from the emulated processor's formats to formats usable by the host processor.

As noted above, an architecture definition includes a description of how a processor constructed in accordance with the architecture is to handle exception conditions which may be detected during instruction processing. Two methodologies have been developed for handling exception conditions. In one methodology, which is representative of processors whose architectures specify a "delayed" exception handling model, if an exception is detected during processing of an instruction, the exception handler is not invoked until some point after the processor has sequenced to processing an instruction after the instruction for which the exception was indicated. For example, in connection with exception handling in the Intel Corporation x86 family of microprocessors, which currently includes its 8086, 8088, 80286, 80386, 80486 and "Pentium™" lines of microprocessors, if an exception condition is detected during processing of a floating point instruction, the microprocessor will not invoke the exception handler for that exception until the next floating point instruction is processed. One benefit of this methodology is that, if the microprocessor does not process another floating point instruction after the exception condition is detected, the exception condition will not need to be dealt with, and so the exception handler will not need to be invoked. However, the processor will generally need to ensure that certain exception status information be retained, perhaps for some time, after the floating point instruction for which an exception condition is detected so that, if the exception handler is eventually invoked, it has the information which it needs to process the exception.

On the other hand, in a second methodology, which is representative of computers whose processors follow a "precise" exception handling model, if an exception condition is detected during processing of an instruction, the exception handler is invoked immediately following operations performed for the instruction. Certain implementations of processors constructed in accordance with this methodology include, for example, those constructed in accordance with the SPARC Version 9 architecture described in SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"). One benefit of this methodology is that, since the exception handler is processed immediately after the processing of the instruction which gave rise to the exception condition, the exception status information needed by the exception handler will be directly available and need not be saved beyond processing for the program instruction which gave rise to the exception condition. However, the methodology will ensure that the processor will always process the exception handler, even if subsequent processing by the processor would not require that the exception condition be dealt with.

A problem arises, however, if it is desired to enable a host processor which follows the "precise" exception handling model to emulate an emulated processor which follows the "delayed" exception handling model. Since, as described above, a host processor which follows the precise exception handling model does not handle exceptions in a manner which is similar to the manner in which exceptions are handled by an emulated processor which follows the delayed exception handling model, it may be difficult to ensure that such a host processor will correctly emulate such an emulated processor.

SUMMARY OF THE INVENTION

The invention provides new and improved systems and methods for facilitating the emulation of a delayed exception mechanism by a processor which has a corresponding precise exception mechanism.

In brief summary, in one aspect the invention provides a digital computer system comprising a precise exception handling processor and a control subsystem. The precise exception handling processor performs processing operations under control of instructions. The precise exception handling processor is constructed in accordance with a precise exception handling model, in which, if an exception condition is detected in connection with an instruction, the exception condition is processed in connection with the instruction. The precise exception handling processor further includes a pending exception indicator having a pending exception indication state and a no pending exception indication state. The control subsystem provides a series of instructions to the precise exception handling processor to facilitate emulation of at least one instruction from an emulated program. The emulated program is constructed to be processed by a delayed exception handling processor which, in turn, is constructed in accordance with a delayed exception handling model, in which if an exception is detected during processing of an instruction, the exception condition is processed in connection with a subsequent instruction. The series of instructions provided by the control subsystem, in emulation of the emulated program instruction, controls the precise exception handling processor to (i) determine whether the pending exception indicator is in the pending exception indication state and, if so, to invoke a routine to process the pending exception and condition the pending exception indicator to the no pending exception indication state (ii) perform processing operations in accordance with the emulated processing instruction; and (iii) if an exception condition is detected during the processing operations, to invoke an exception handler in accordance with the processor's precise exception handling model to condition the pending exception indicator to the pending exception indication state, so that the exception condition will be processed during processing operations for a subsequent emulated program instruction.

If the control subsystem provides instructions to enable the precise exception handling processor to perform these operations in connection with at least some of the instructions from the emulated program, the precise exception handling processor will be enabled by the instructions provided by the control subsystem:

(a) to invoke an exception handler, in accordance with the precise exception handling processor's precise exception handling model, when an exception condition is indicated during processing of instructions provided for an emulated program instruction, to control the pending exception indicator to indicate the existence of a pending exception condition (which operation is enabled by (iii) above), and (b) to process the pending exception condition during processing of a subsequent emulated program instruction (which operation is enabled by (i) above), thereby to emulate the delayed exception handling model of the delayed exception handling processor being emulated.

In accordance with another aspect, the invention provides translation system for generating at least one translated instruction in response to at least one emulated program instruction constructed to be processed by a delayed exception handling processor which is constructed in accordance with a delayed exception handling model, in which if an exception is detected during processing of an instruction, the exception condition is processed in connection with a subsequent instruction, for processing by a precise exception handling processor constructed in accordance with a precise exception handling model in which, if an exception condition is detected in connection with an instruction, the exception condition is processed in connection with the instruction, the precise exception handling processor including a pending exception indicator having a pending exception indication state and a no pending exception indication state. The at least one translated instruction controls the precise exception handling processor to (i) determine whether the pending exception indicator is in the pending exception indication state and, if so, to invoke a pending exception processing routine to process the pending exception;

(ii) perform a processing operation in accordance with the emulated processing instruction; and (iii) if an exception condition is detected during the processing operation, to invoke an exception handler in accordance with the precise exception handling processor's precise exception handling model to condition the pending exception indicator to the pending exception indication state, so that the exception condition will be processed during a processing operation for a subsequent emulated program instruction.

If a series of such instruction are provided to the precise exception handling processor, the precise exception handling processor will be enabled:

(a) to invoke an exception handler, in accordance with the precise exception handling processor's precise exception handling model, when an exception condition is indicated during processing of instructions provided for an emulated program instruction, to control the pending exception indicator to indicate the existence of a pending exception condition (which operation is enabled by (iii) above), and (b) to process the pending exception condition during processing of a subsequent emulated program instruction (which operation is enabled by (i) above), thereby to emulate the delayed exception handling model of the processor being emulated.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
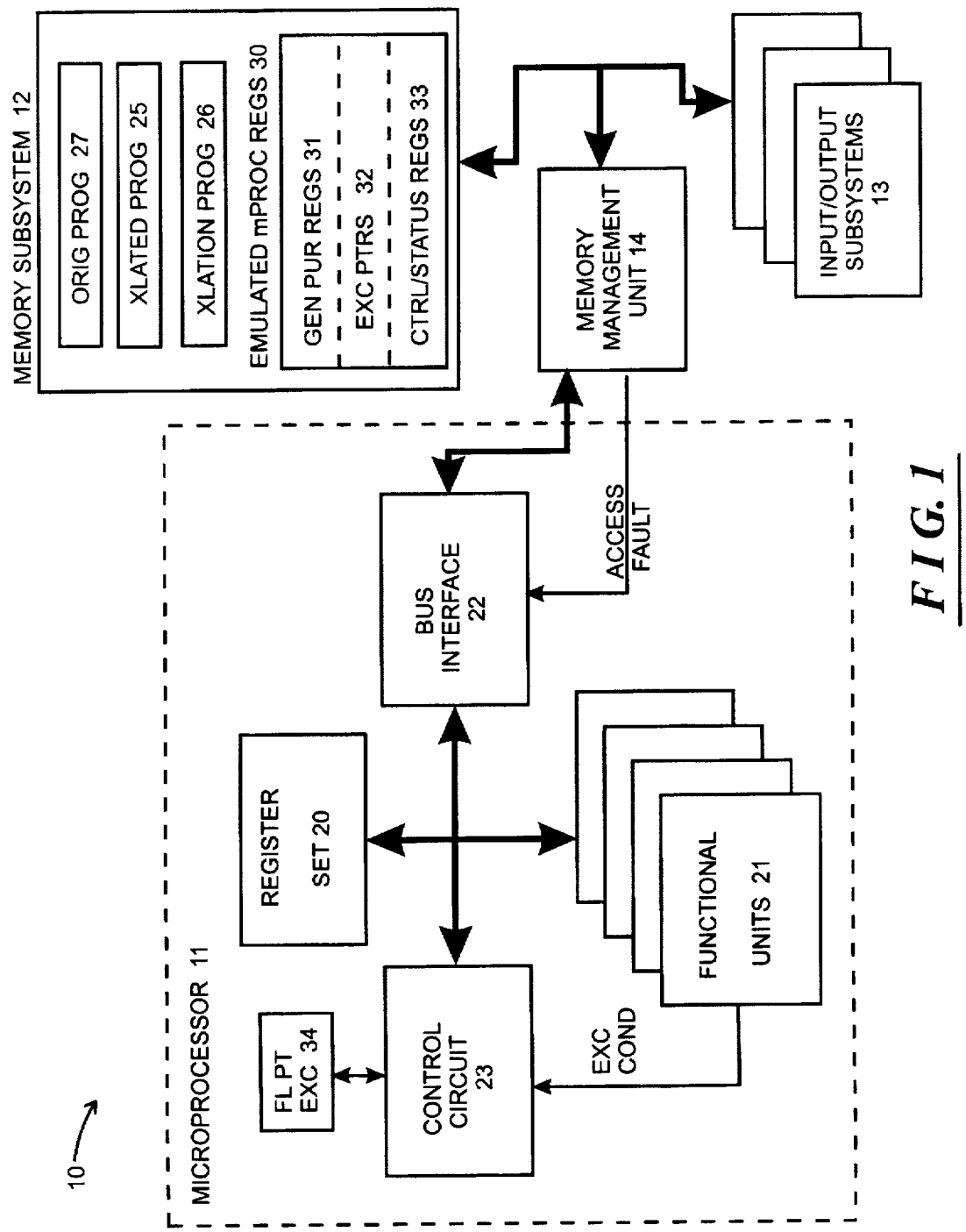
FIG. 1 is a functional block diagram depicting a digital computer system constructed in accordance with the invention.

FIG. 1 is a functional block diagram of a digital computer system 10 constructed in accordance with the invention. With reference to FIG. 1, the digital computer system 10 includes a microprocessor 11 which communicates with a memory subsystem 12 and one or more input/output subsystems generally identified by reference numeral 13 through a memory management unit 14. The microprocessor 11 processes programs, including an operating system and one or more application programs all of which comprise instructions, in accordance with data, with the instructions and data (which collectively will be referred to herein as "information") being stored in the memory subsystem 12. Typically, the microprocessor 11 will retrieve instructions and data from the memory subsystem 12 for processing, and will store processed data in the memory subsystem 12. The memory subsystem 12 includes a number of addressable storage locations in which information to be processed by the microprocessor 11 may be stored, and in which the microprocessor 11 may store the processed data.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC Architecture Manual, Version 9. The microprocessor 11 generally includes a number of elements, including a register set 20, one or more functional units 21, a bus interface 22 and a control circuit 23. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

The operations performed by the microprocessor 11, under control of the control circuit 23, are controlled by program instructions, which control the loading of data in the register set 20, the operations performed by the functional units 21 and the transfer of data from the register set 20 to the memory subsystem 12 or the input/output devices 13 for storage. During processing of an instruction, depending on the values of the particular data to be processed and the particular operation to be performed, the functional unit 21 may generate an EXC COND exception condition indication, indicating that an exception condition has been encountered during processing that requires further processing. A number of exception conditions are known in the art, including, for example, generation of a zero, underflow or overflow result during an integer or floating point operation, generation of a de-normalized result during a floating point operation, and so forth. In response to generation of an EXC COND exception condition indication, the control circuit 23 invokes an exception handler that determines the nature of the exception condition and the operations to be performed in response thereto.

In one particular embodiment, the microprocessor 11, in particular, the control circuit 23, receives the EXC COND exception condition indication from a functional unit 21 and invokes a handler to process it during or immediately after it completes operations for the instruction for which the EXC COND exception condition indication was generated, and before initiating processing operations in connection with the next instruction in the program. Accordingly, the microprocessor 11 features a "precise" exception handling model.

In that same embodiment, the microprocessor 11 is used in the digital computer system 10 in connection with emulation of a microprocessor which features a "delayed" exception handling model. One microprocessor family which features such a delayed exception handling model is, for example, Intel Corporation's x86 family (which currently includes its 8086, 8088, 80286, 80386, 80486 and "Pentium™" lines of microprocessors). In a microprocessor which features a delayed exception handling model, the microprocessor during processing of an instruction for which an EXC COND exception condition has been generated will, for at least selected types of exception conditions, record the fact that an EXC COND exception condition indication has been generated and during processing of a selected subsequent instruction will invoke the exception handler to process the pending exception condition, that is, the exception condition which was indicated for a previous instruction. In connection with the aforementioned Intel x86 family of microprocessors, the delayed exception handling model is used for specific types of instructions, in particular, for floating point instructions. Accordingly, when an EXC COND exception condition indication is generated by a microprocessor of the x86 family during processing of a floating point instruction, the microprocessor stores an exception pointer which comprises information relating to the exception condition, and invokes the exception handler during processing of the next floating point instruction. The exception handler may use the previously-saved exception pointer in its processing to identify the particular exception condition or conditions to be processed.

The invention provides an arrangement whereby a microprocessor, such as microprocessor 11, which features a precise exception handling model, is enabled to emulate a microprocessor, such as a microprocessor of the Intel x86 family, which features a delayed exception handling model. The microprocessor 11 which features the precise exception handling model will be referred to herein as the "host" microprocessor 11, and the microprocessor which features the delayed exception handling model will be referred to herein as the "emulated" microprocessor. More specifically, the invention provides an arrangement which enables the host microprocessor 11, while processing a "translated" program 25 which is generated by a translation program 26, to emulate operations performed by an emulated microprocessor (not shown) in processing an "original" program 27 that was written for the emulated microprocessor, and in particular enables the host microprocessor 11 to emulate the manner in which the emulated microprocessor handles processing in connection with floating point exception conditions.

In that operation, the host microprocessor 11, in response to an EXC COND exception condition indication being generated during processing of an instruction of the translated program 25, which is based on a floating point instruction of the original program 27, will effectively record an indication that the exception condition indication had been generated, thereby to indicate that a pending floating point exception condition exists. While processing the instruction or group of instructions of the translated program generated for a subsequent floating point instruction, if any, of the original program 27, the microprocessor 11 will be enabled to invoke a floating point exception handler to process the pending floating point exception.

These operations are enabled by the translated program 25, so that for each floating point instruction of the original program 27 to be emulated by the microprocessor 11 the translation program provides one or more instructions to:

(i) enable the host microprocessor 11 to determine whether a pending floating point condition exists, that is, to determine whether a floating point exception condition had been recorded for a previous floating point instruction, and, if so, to enable the host microprocessor 11 to process the pending floating point exception. These operations may be enabled in whole or in part by, for example, one or a series of instructions provided as part of the translated program 25 by the translation program 26 for the floating point instruction of the original program 27, or as part of an exception handler that the host microprocessor 11 may invoke such during processing;

(ii) enable the host microprocessor 11 to perform the operations required for the floating point instruction from the original program 27; and (iii) enable the host microprocessor 11 to, if an exception condition indication is generated during processing in (ii) above, to record the indication, thereby to indicate that a pending floating point exception condition exists. In addition, the instructions may enable the host microprocessor 11 to store exception information (such as the above-described exception pointer information) which may be necessary to process the pending floating point exception condition. The host microprocessor 11 performs the operations in (iii) in accordance with its precise exception handling model, in which case the operations may be enabled at least in part by an exception handler provided for the microprocessor 11.

Accordingly, it will be appreciated that such a translated program 25 as generated by the translation program 26 provides instructions to enable the host microprocessor 11:

(a) in accordance with its (the host microprocessor's) precise exception handling model, to record the fact that an exception condition indication had been generated during processing operations for one floating point instruction for the original program, thereby to indicate the existence of a pending floating point exception condition (which operation is enabled by the instruction or series of instructions described in (iii) above), and (b) to process the pending floating point exception condition during processing of a subsequent floating point instruction for the original program (which operation is enabled by the instruction or series of instructions described in (i) above), thereby to emulate the delayed exception handling model of the microprocessor being emulated.

The operations performed by the host microprocessor 11 in connection with a translated program 25 will be described in connection with the block diagram depicted in FIG. 1, with FIG. 2, which contains a flow diagram useful in understanding the operations performed by the host microprocessor 11 in connection with the translation program 26, and with FIGS. 3 and 4, which contain flow charts which are useful in understanding two embodiments of the invention, each of which illustrates a particular mechanism by which a pending floating point exception condition is indicated during processing by the microprocessor 11.

With continued reference to FIG. 1, the host microprocessor 11 maintains an emulated microprocessor register set 30, which generally will include registers which would reside in the emulated microprocessor and which may be accessed by an application program for the emulated microprocessor or to an operating system for the emulated microprocessor. The registers in the emulated microprocessor register set 30 would include, for example, the emulated microprocessor's general purpose register set 31, an exception pointer store 32, which stores the exception pointers to be used in connection with processing of the exception handler as described above, and may also include the emulated microprocessor's control and status register(s) 33. The host microprocessor 11 may maintain the emulated microprocessor register set 30 in its memory subsystem 12 or in its own register set 20.

In addition, in accordance with one embodiment of the invention, which will be described below in connection with the flow chart in FIG. 3, the host microprocessor 11 maintains a floating point exception flag 34 which will be used to indicate that a pending fault condition exists. In FIG. 1, the floating point exception flag 34 is shown as comprising part of the host microprocessor 11, but it will be appreciated that it may comprise an element maintained elsewhere in the system 10, such as, for example, the emulated registers in the emulated microprocessor register set 30. Generally, the host microprocessor 11 will, in response to the generation of an EXC COND exception condition indication by a functional unit 21 during processing of one floating point instruction, enable the setting of the floating point exception flag 34, thereby to indicate the existence of a pending floating point exception condition, and the saving of information to be used later in processing of the pending floating point exception condition. The information to be saved may be loaded in, for example, the exception pointer store 32 in the emulated microprocessor register set 30. As described above, the host microprocessor 11 is constructed according to the "precise" exception handling model, and so the setting of the floating point exception flag 34 and the saving of the information for later use may comprise operations enabled by the host microprocessor's "precise" exception handler in response to the generation of the EXC COND exception condition indication.

After the host microprocessor 11 sets the floating point exception flag 34 and saves the exception information, it will then sequence to begin processing the instruction or series of instructions of the translated program 25 which the translation program 26 enables to be generated for the next instruction of the original program 27. At the beginning of each instruction or series of instructions of the translated program 25, for emulation of each floating point instruction of the original program 27, the host microprocessor 11 determines from the condition of the floating point exception flag 34 whether a pending floating point exception condition exists, thereby to determine whether an exception condition indication was generated for the previous floating point instruction. If a pending floating point fault condition exists, the translated program sequence will enable the microprocessor 11 to invoke a routine to handle the pending floating point exception condition, and thereafter proceed to operations for processing of the current floating point instruction for the original program. Accordingly, the translated program enables the host microprocessor 11 to handle exception conditions in a delayed manner, which is similar to the manner in which the emulated microprocessor handles exception conditions.

More specifically, if host microprocessor 11 determines at the beginning of operations for executing a floating point instruction that the floating point exception flag 34 is set, the host microprocessor 11 invokes a handler to process the floating point exception condition which is represented by the exception pointers previously saved in the exception pointer store 32. The handler which is invoked at this point may constitute the floating point exception handler which would normally be processed by the emulated microprocessor, which may be emulated by the host microprocessor 11. Alternatively, the handler may constitute a routine which would normally be called by the host microprocessor to process exception conditions of the type indicated by the exception pointers previously saved in the exception pointer store 32. In either case, after processing the floating point exception handler, the host microprocessor 11 will typically enable the operations required by the floating point instruction (that is, the floating point instruction after the floating point instruction for which the EXC COND exception condition indication was generated).

On the other hand, if the host microprocessor 11 determines at the beginning of the operations for executing a floating point instruction, that the floating point exception flag 34 is not set, no EXC COND exception condition indication was generated for the previous floating point instruction. In that case, the host microprocessor 11 will bypass the floating point exception handler and sequence directly to the operations required by the floating point instruction. Thus, the host microprocessor 11, which features the precise exception handling model, handles floating point exceptions which are indicated for a particular floating point instruction at the beginning of processing of the next floating point instruction, in conformance with the delayed exception handling model which is characteristic of the emulated microprocessor which is being emulated by the host microprocessor 11, with the existence of pending floating point exception condition for a previous floating point instruction being indicated by the condition of the floating point exception flag 34.

In one embodiment, in which microprocessor 11 is constructed in accordance with the SPARC Version 9 architecture described in the SPARC Architecture Manual, Version 9, the floating point exception flag 34 may comprise, for example, a "floating point enable" flag, which may be conditioned to enable and disable a floating point functional unit in functional units 21. In addition, each floating point instruction in the original program 27 typically will be emulated by at least one floating point instruction in the translated program 25. In that embodiment, if a pending fault condition does not exist, the floating point enable flag will be set, which enables operations by the floating point functional unit. On the other hand, if a pending fault condition exists, the floating point enable flag will be clear, which typically disables operations by the floating point functional unit. (It will be appreciated that the condition of the floating point enable flag as described herein corresponds to the complement of the condition of the floating point exception flag 34 as described above.) In that case, if the floating point enable flag is clear when the host microprocessor 11 attempts to execute a floating point instruction, an exception indication is generated, and an exception handler will be invoked. The exception handler will, at that point, process the pending floating point exception, set the floating point enable flag and enable the host microprocessor 11 to resume processing of the floating point instruction.

In accordance with the second embodiment of the invention, the host microprocessor 11 also may make use of the emulated microprocessor general purpose register set 31, emulation pointer store 32 and control and status registers 33 in emulating the emulated microprocessor. However, the host microprocessor 11 does not make use of a floating point exception flag 34 shown in FIG. 1 to indicate whether a pending floating point exception condition exists. Instead, in the second embodiment, the host microprocessor 11 indicates whether a pending floating point exception condition exists by controlling the access permission to a selected page of the virtual address space for the currently-executing program, which page is otherwise not used for storing data or instructions to be processed.

In particular, if during processing of one or a series of instructions provided in the translated program 25, for a floating point instruction in the original program 27, an exception indication is generated, the microprocessor 11 is enabled to step to one or a sequence of instructions to disable, for example, write access to the page, thereby to indicate that a pending floating point exception condition exists. The instruction or series of instructions that are provided in the translated program 25, for each floating point instruction in the original program 27, will include a store instruction which enables the microprocessor 11 to attempt to store data in the page. If an access fault is not generated during processing of the store instruction, the microprocessor 11 will determine that a pending floating point exception condition does not exist, in which case it can proceed to process the following instructions in the translated program 25, in particular to perform the operations required to emulate the floating point instruction in the original program 27.

On the other hand, if an access fault indication is generated while processing the store instruction, the host microprocessor 11 will determine that a pending floating point exception condition exists. In that case, case the host microprocessor 11 can invoke an exception handler to process the pending floating point exception. During processing of the exception handler, the microprocessor 11 can modify the access permission for the selected page to enable access thereto, thereby to erase the indication that a pending floating point exception condition exists. After the host microprocessor 11 has processed the exception handler, it can repeat the store instruction, which, since write access is now enabled, will complete without generation of an access fault indication. After the host microprocessor 11 has completed processing of the store instruction, it can proceed to process the following instructions in the translated program 25, to perform the operations required to emulate the floating point instruction in the original program 27.

It will be appreciated that the translation program 26 will provide the store instruction in the translated program in a location in which the host microprocessor 11 will execute it before any instruction which would require that the pending floating point exception condition be processed.

More specifically, when the selected page is established, all of the storage locations therein will be initialized to contain one or more predetermined values, such as "zero." In accordance with the second embodiment, the host microprocessor 11, in response to the generation of an EXC COND exception condition indication by a functional unit 21 during processing of a floating point instruction, will enable the memory management unit 14 to, in turn, control the access permission for the selected page so that an access fault indication will be generated if an attempt is made to store data in the page. The operations performed by the host microprocessor 11 in enabling the memory management unit 14 to control the write permission to the page may, in turn, be controlled by an exception handler which is invoked during processing of in accordance with the host microprocessor's precise exception handling model. Thereafter, the host microprocessor 11 will sequence to begin processing of the next instruction.

Proximate to the beginning of the instructions of the translated program 25 for executing each floating point instruction of the original program 27, an instruction will be provided to enable the host microprocessor 11 to, in turn, initiate a storage operation to store the selected value (such as zero) in a storage location in the selected page. If the memory management unit 14 determines that the translated program 25 has permission to store data in the selected page, it will not generate an access fault indication, indicating that no pending floating point exception condition exists. In that case, the host microprocessor 11 sequence to the instruction or instructions of the translated program 25 generated for the floating point instruction of the original program currently being processed.

On the other hand, if the memory management unit 14 determines that the translated program 25 does not have permission to store data in the selected page, the memory management unit 14 will generate an access fault indication, thereby indicating that a pending floating point exception fault exists. In response to the access fault indication, the host microprocessor 11 may initiate processing of the floating point exception handler using the exception pointer stored 32 in the emulated microprocessor register set 30. After processing the floating point exception handler, the host microprocessor 11 will sequence to enable the operations required by the current floating point instruction (that is, the floating point instruction after the floating point instruction for which the EXC COND exception condition indication was generated).

Thus, the host microprocessor 11, which features the precise exception handling model, handles floating point exceptions which are indicated for a particular floating point instruction at the beginning of processing of the next floating point instruction, as required in the delayed exception handling model which is characteristic of the emulated microprocessor which is being emulated by the host microprocessor 11, with the existence of pending floating point exception condition for a previous floating point instruction being indicated by the accessibility of the selected page.

With this background, the operations performed by the host microprocessor 11 in connection with the respective embodiments will be described in connection with the flow charts depicted in FIGS. 2 through 4. The flow chart in FIG. 2 depicts operations performed by, for example, host microprocessor 11 under control of the translation program 26 in generating the instruction(s) for the translated program 25 for a floating point instruction of the original program 27. The flow charts in FIGS. 3 and 4 depict operations performed by the host microprocessor 11 under control of one or more instruction(s) of the translated program 25 generated for a floating point instruction of the original instruction 27. FIG. 3 generally illustrates the operations performed under control of instruction(s) generated in connection with the first embodiment, that is, the embodiment which uses the floating point exception flag 34 to indicate the existence of a pending floating point exception condition. On the other hand, FIG. 4 generally illustrates the operations performed under control of instruction(s) generated in connection with the second embodiment, that is, the embodiment which uses the access permission for a selected page of the virtual address space to indicate the existence of a pending floating point exception condition.

Figure 2:
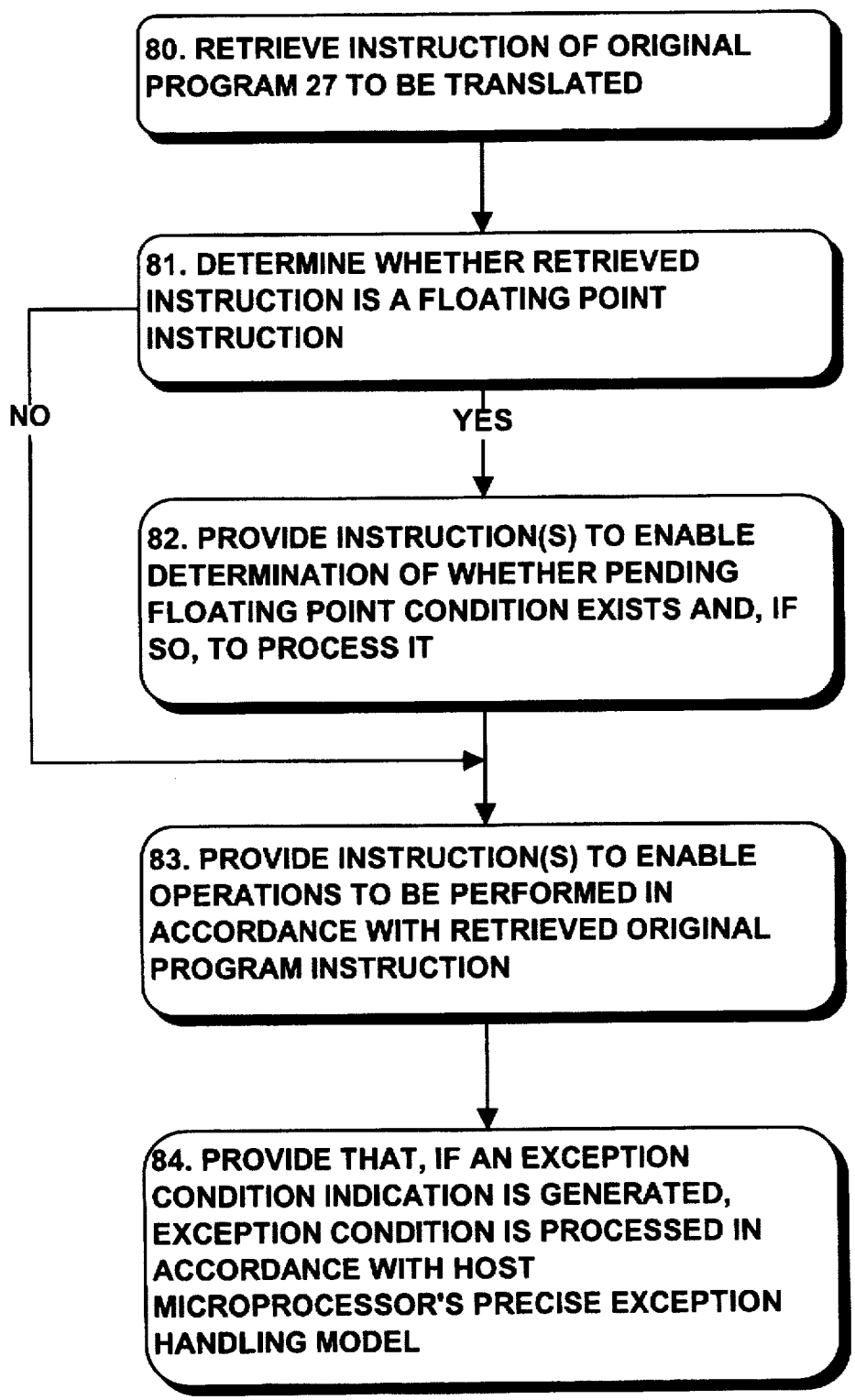
FIG. 2 is a flow chart depicting operations performed by the digital computer system in connection with translating instructions of an original program into a translated program in accordance with the invention.

FIG. 2 depicts operations performed by, for example, host microprocessor 11 [or another microprocessor in digital computer system 10 (not shown), or another digital computer system (also not shown)] under control of the translation program 26 in generating the instruction(s) for the translated program 25 for a floating point instruction of the original program 27. With reference to FIG. 2, the translation program 26 will initially enable the host microprocessor 11 to retrieve an instruction of the original program 27 to be translated (step 80). The translation program 26 will then enable the host microprocessor 11 to determine whether the retrieved original program instruction is a floating point instruction (step 81). If a positive determination is made in step 81, the translation program 26 will enable the host microprocessor 11 to provide one or more instructions to enable the host microprocessor 11 to determine whether a pending floating point condition exists and, if so, to process the pending condition. Following step 82, or following step 81, if the host microprocessor 11, under control of the translation program 26 determines that the retrieved original program instruction was not a floating point instruction, the translation program will provide one or more instruction(s) to enable the host microprocessor 11 to generate instructions to enable operations required for the retrieved original program instruction to be performed (step 83). In addition, the translation program 26 will provide that the host microprocessor 11, when processing the translated program 25, if an exception condition indication is generated during processing of the instructions generated in step 83, will invoke an exception handler to process the exception condition in accordance with its precise exception handling model (step 84). In that connection, if the instruction of the original program 27 that was retrieved in step 80 was a floating point instruction, the host microprocessor 11, when it invokes the exception handler pending will record the exception condition indication thereby to indicate that a pending floating point exception condition exists, and may also store exception information (such as the above-described exception pointer information) which may be necessary to process the pending floating point exception condition.

As described above, the microprocessor 11 in one embodiment is constructed in accordance with the SPARC Version 9 architecture described in the SPARC Architecture Manual, Version 9 , and the floating point exception flag 34 comprises, the "floating point enable" flag, which may be conditioned to enable and disable the floating point functional unit in functional units 21. It will be appreciated that, if the translation program 26, in step 83, enables the microprocessor to provide at least one floating point instruction in the translated program 25 for each floating point instruction in the original program, when the first translated program floating point instruction is executed the host microprocessor 11 will effectively test the condition of the floating point enable flag and thereby automatically determine whether a pending floating point exception condition exists. In that case, the translation program 26 will not need to enable additional instructions to be provided to test the floating point enable flag (reference step 82), and indeed will not need to enable the retrieved instruction (reference step 81) to be tested to determine whether it is an floating point instruction.

In addition, it will be appreciated that, in that case, the operations described in connection with step 82 in processing the pending floating point condition may be enabled by an exception handler provided for the host microprocessor for processing of the translated program. Further, the operations described in connection with step 84 to record the generated exception condition indication and exception information may be enabled by an exception handler provided for the host microprocessor 11 for processing of the translated program.

Figure 3:
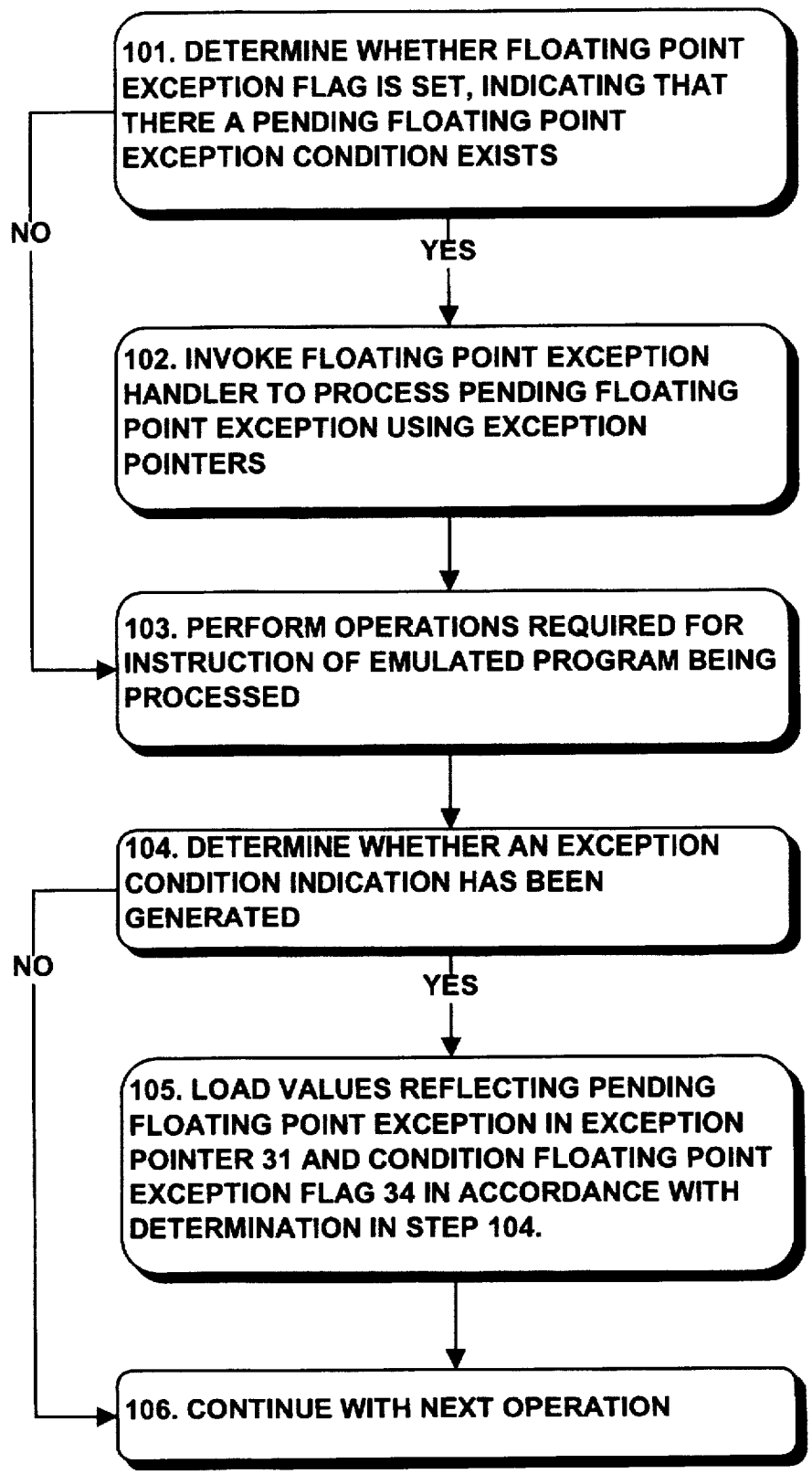
FIG. 3 is a flow chart depicting operations performed by the digital computer system in connection with a first embodiment of the invention.

FIG. 3 generally illustrates the operations performed under control of instruction(s) generated in connection with the first embodiment, that is, the embodiment which uses the floating point exception flag 34 to indicate the existence of a pending floating point exception condition. With reference to FIG. 3, the host microprocessor 11 will initially process an instruction of the translated program to determine whether the floating point exception flag 34 is set (step 101), which, in turn, indicates whether there is a pending floating point exception that was indicated during execution of a previous floating point instruction of the original program 27. If the host microprocessor 11 makes a positive determination in step 101, it invokes the floating point exception handler to process the pending floating point exception (step 102).

After the pending floating point exception has been processed (step 102), or following step 101 if the host microprocessor 11 determines in that step that the floating point exception flag 34 is not set (which, in turn, indicates that there is no pending floating point exception), the microprocessor 11 processes one or more instruction(s) required to perform the operations required for the floating point instruction of the original program being processed (step 103). At some point during the operations performed in connection with step 103, the functional units 21 which are enabled to actually perform the operations may generate an EXC COND exception condition indication, which the host microprocessor 11 will recognize in step 104. If the microprocessor 11 determines in step 104 that an EXC COND exception condition indication has been generated, it will sequence to step 105 to set the floating point exception flag 34, thereby to indicate the pending floating point exception condition. Following step 105, or following step 104 if the host microprocessor 11 makes a negative determination in that step, the host microprocessor 11 will proceed to processing of the instruction(s) of the translated program 25 which for the next instruction of the original program 27.

Figure 4:
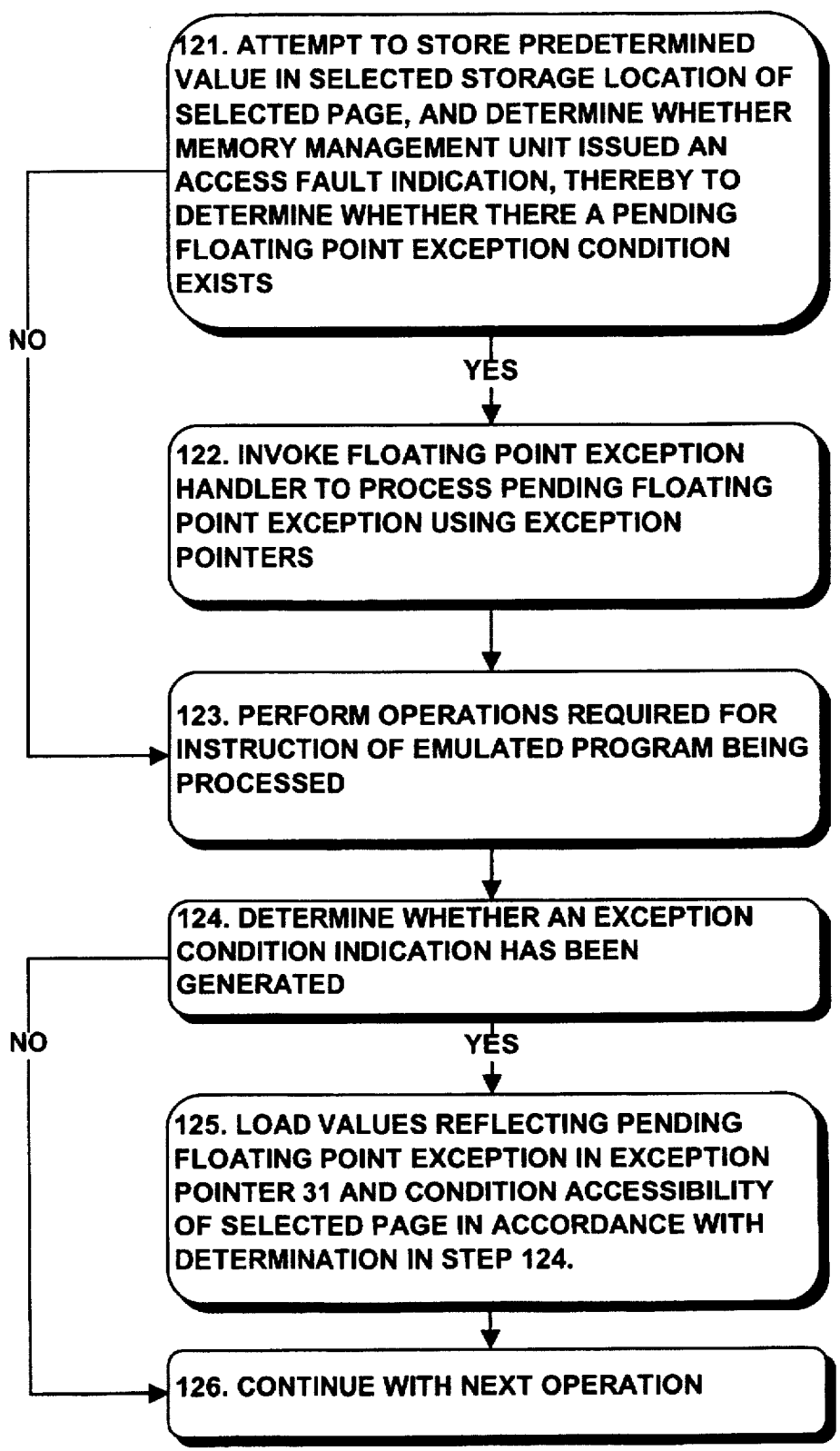
FIG. 4 is a flow chart depicting operations performed by the digital computer system in connection with a second embodiment of the invention.

FIG. 4 generally illustrates the operations performed under control of instruction(s) generated in connection with the second embodiment, that is, the embodiment which uses the access permission for a selected page of the virtual address space to indicate the existence of a pending floating point exception condition. With reference to FIG. 4, the host microprocessor 11 will initially process a store instruction of the translated program 25 to attempt to store data in a selected page of the virtual address space and determine whether the memory management unit 14 generates an access fault indication (step 121), which, in turn, indicates whether there is a pending floating point exception that was indicated during execution of a previous floating point instruction of the original program 27. If the host microprocessor 11 makes a positive determination in step 121, it invokes the access fault exception handler to process the pending floating point exception (step 122).

After the pending floating point exception has been processed (step 122), or following step 121 if the host microprocessor 11 determines in that step that the memory management unit 14 does not generate an access fault indication during the store operation (which, in turn, indicates that there is no pending floating point exception), the host microprocessor 11 processes one or more instruction(s) required to perform the operations required for the floating point instruction of the original program being processed (step 123). At some point during the operations performed in connection with step 123, the functional units 21 which are enabled to actually perform the operations may generate an EXC COND exception condition indication, which the host microprocessor 11 will recognize in step 124. If the microprocessor 11 determines in step 124 that an EXC COND exception condition indication has been generated, it will sequence to step 125 to make the selected page inaccessible for storage operations, thereby to indicate the pending floating point exception condition. Following step 125, or following step 124 if the host microprocessor 11 makes a negative determination in that step, the host microprocessor 11 will proceed to processing of the instruction(s) of the translated program 25 which for the next instruction of the original program 27.

It will be appreciated that the invention provides a number of advantages. In particular, it provides an arrangement whereby a microprocessor which features a "precise" exception handling model, will correctly emulate a microprocessor which features a "delayed" exception handling model for use in handling exceptions in connection with floating point instructions.

Although the invention has been described in connection with handling of exceptions which are generated during processing of floating point instructions, it will be appreciated that the invention may further be used in connection with handling of exceptions which are generated during a myriad of other types of instructions, including, for example, integer instructions, logical instructions and program flow control instruction. In addition, although the invention has been described in connection with a system in which pending fault conditions generated during processing of instructions of a particular type (such as a floating point instruction) are processed during processing of a subsequent instruction of the same type, it will be appreciated that the pending fault conditions which are generated during processing of instructions of a particular type may be processed during processing of a subsequent instruction of any type.

Furthermore, although the invention has been described in terms of a host microprocessor 11 which makes use of a floating point flag 34 to explicitly indicate the existence of a pending floating point exception condition, and an access fault indication to implicitly indicate the existence of a pending floating point exception condition, it will be appreciated that numerous other mechanisms which may be accessed and controlled during processing of instructions of the translated program 25 can be used to indicate the existence of a pending floating point exception condition.

It will be appreciated that a number of variations and modifications may be made to the embodiment described above in connection with FIGS. 1 through 3. For example, while the host microprocessor 11 and memory management unit 14 have been depicted in FIG. 1 as comprising separate elements, with the memory management unit 14 communicating with the microprocessor through the bus interface 22, it will be appreciated that the host microprocessor 11 and memory management unit 14 may comprise a single element integrated together on one or more integrated circuit chips. If the host microprocessor 11 and memory management unit 14 are integrated together, the bus interface 22 and memory management unit 14 may, for example, be unified into a single element.

It will be further appreciated that the entire host microprocessor 11, constructed in accordance with a selected architecture (such as the aforementioned SPARC, Version 9 , architecture as described in the aforementioned SPARC Architecture Manual, Version 9) further including the delayed exception emulation facility in accordance with the invention, may be emulated using a microprocessor of, for example, another architecture as provided with suitable emulation programs or microcode.

Furthermore, it will be appreciated that a microprocessor 11 including a delayed exception emulation facility in accordance with the invention can be constructed in whole or in part from special purpose hardware or one or more program-controllable devices which any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital computer system comprising:
   A. a precise exception handling processor for performing processing operations under control of instructions, the processor being constructed in accordance with a precise exception handling model in which, if an exception condition is detected in connection with an instruction, the exception condition is processed in connection with the instruction, the processor further including a pending exception indicator having a pending exception indication state and a no pending exception indication state; and
   B. a control subsystem for providing at least one instruction to the precise exception handling processor to facilitate emulation of an emulated program instruction, the emulated program instruction being constructed to be processed by a delayed exception handling processor which is constructed in accordance with a delayed exception handling model, in which if an exception is detected during processing of an instruction, the exception condition is processed in connection with a subsequent instruction, the instruction provided by said control subsystem controlling said precise exception handling processor to
      i. determine whether the pending exception indicator is in the pending exception indication state and, if so, to invoke a pending exception processing routine to process the pending exception;
      ii. perform a processing operation in accordance with the emulated processing instruction; and
      iii. if an exception condition is detected during the processing operation, to invoke an exception handler in accordance with the processor's precise exception handling model to condition said pending exception indicator to said pending exception indication state, so that the exception condition will be processed during a processing operation for a subsequent emulated program instruction.

2. A digital computer system as defined in claim 1 in which the control subsystem further enables said precise exception handling processor to, if it determines that the pending exception indicator is in the pending exception indication state, condition the pending exception indicator to the no pending exception indication state.

3. A digital computer system as defined in claim 1, in which said emulated program instruction is selected from a set of emulated program instructions which can be processed by said delayed exception handling processor, the set of emulated program instructions being divided into a plurality of types, and further in which the control subsystem provides the instruction to control the precise exception handling processor as set forth in claim 1 in accordance with an emulated program instruction of a selected emulated program instruction type.

4. A digital computer system as defined in claim 3 in which instructions of said selected emulated program instruction type comprise floating point instructions.

5. A digital computer system as defined in claim 1, in which the instruction provided by said control subsystem is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the control subsystem providing at least one instruction of said selected type which enables the precise exception handling processor to test the flag and, if the flag is in the disable condition, invoke said pending exception processing routine.

6. A digital computer system as defined in claim 5 in which instructions of said selected instruction type comprise floating point instructions.

7. A digital computer system as defined in claim 1 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the control subsystem providing at least one instruction of said selected type which enables the precise exception handling processor to test the access indicator and, if the access indicator is in the no access permitted state, invoke said pending exception processing routine.

8. A digital computer system as defined in claim 7 in which said memory is divided into pages, and in which said at least a portion of said memory comprises a selected one of said pages.

9. A digital computer system as defined in claim 7 in which said at least one instruction of a selected type comprises a store instruction which enables the precise exception handling processor to perform a storage operation to store information in said memory.

10. A control subsystem for use in connection with a precise exception handling processor, the precise exception handling processor performing processing operations under control of instructions, the precise exception handling processor being constructed in accordance with a precise exception handling model, in which, if an exception condition is detected in connection with an instruction, the exception condition is processed in connection with the instruction, the precise exception handling processor further including a pending exception indicator having a pending exception indication state and a no pending exception indication state, the control subsystem providing at least one instruction to said precise exception handling processor to facilitate emulation of at least one emulated program instruction, the emulated program instruction being constructed to be processed by delayed exception handling processor which is constructed in accordance with a delayed exception handling model, in which if an exception is detected during processing of an instruction, the exception condition is processed in connection with a subsequent instruction, the at least one instruction provided by said control subsystem controlling said precise exception handling processor to A. determine whether the pending exception indicator is in the pending exception indication state and, if so, to invoke a routine to process the pending exception and condition the pending exception indicator to said no pending exception indication state;

B. perform a processing operation in accordance with the emulated processing instruction; and C. if an exception condition is detected during said processing operation, to invoke an exception handler in accordance with the precise exception handling processor's precise exception handling model to condition said pending exception indicator to said pending exception indication state, so that the exception condition will be processed during a processing operation for a subsequent emulated program instruction.

11. A control subsystem as defined in claim 10, the control subsystem further enabling said precise exception handling processor to, if it determines that the pending exception indicator is in the pending exception indication state, condition the pending exception indicator to the no pending exception indication state.

12. A control subsystem as defined in claim 10, in which said emulated program instruction is selected from a set of emulated program instructions which can be processed by said delayed exception handling processor, the set of emulated program instructions being divided into a plurality of types, and further in which the control subsystem provides the instruction to control the precise exception handling processor as set forth in claim 10 in accordance with an emulated program instruction of a selected emulated program instruction type.

13. A control subsystem as defined in claim 12 in which instructions of said selected emulated program instruction type comprise floating point instructions.

14. A control subsystem as defined in claim 10, in which the instruction provided by said control subsystem is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the control subsystem providing at least one instruction of said selected type which enables the precise exception handling processor to test the flag and, if the flag is in the disable condition, invoke said pending exception processing routine.

15. A control subsystem as defined in claim 14 in which instructions of said selected instruction type comprise floating point instructions.

16. A control subsystem as defined in claim 10 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the control subsystem providing at least one instruction of said selected type which enables the precise exception handling processor to test the access indicator and, if the access indicator is in the no access permitted state, invoke said pending exception processing routine.

17. A control subsystem as defined in claim 16 in which said memory is divided into pages, and in which said at least a portion of said memory comprises a selected one of said pages.

18. A control subsystem as defined in claim 16 in which said at least one instruction of a selected type comprises a store instruction which enables the precise exception handling processor to perform a storage operation to store information in said memory.

19. An emulation program computer program product including a computer readable medium for use in connection with a precise exception handling processor, the precise exception handling processor performing processing operations under control of instructions, the precise exception handling processor being constructed in accordance with a precise exception handling model, in which, if an exception condition is detected in connection with an instruction, the exception condition is processed in connection with the instruction, the precise exception handling processor further including a pending exception indicator having a pending exception indication state and a no pending exception indication state, the computer readable medium having encoded thereon at least one code device for controlling said precise exception handling processor to facilitate emulation of at least one emulated program instruction, the emulated program instruction being constructed to be processed by a delayed exception handling processor which is constructed in accordance with a delayed exception handling model, in which if an exception is detected during processing of an instruction, the exception condition is processed in connection with a subsequent instruction, the code device controlling said precise exception handling processor to A. determine whether the pending exception indicator is in the pending exception indication state and, if so, to invoke a routine to process the pending exception and condition the pending exception indicator to said no pending exception indication state;

B. perform a processing operation in accordance with the emulated processing instruction; and C. if an exception condition is detected during said processing operation, to invoke an exception handler in accordance with the precise exception handling processor's precise exception handling model to condition said pending exception indicator to said pending exception indication state, so that the exception condition will be processed during the processing operation for a subsequent emulated program instruction.

20. A emulation program computer program product as defined in claim 19, the emulating program computer program product including at least one code device for controlling said precise exception handling processor to, if it determines that the pending exception indicator is in the pending exception indication state, condition the pending exception indicator to the no pending exception indication state.

21. A emulation program computer program product as defined in claim 19, in which said emulated program instruction is selected from a set of emulated program instructions which can be processed by said delayed exception handling processor, the set of emulated program instructions being divided into a plurality of types, and further in which the emulation program computer program product includes at least one code device for controlling the precise exception handling processor as set forth in claim 19 in accordance with an emulated program instruction of a selected emulated program instruction type.

22. A emulation program computer program product as defined in claim 21 in which instructions of said selected emulated program instruction type are floating point instructions.

23. A emulation program computer program product as defined in claim 19, in which the code device comprising the emulation program computer program product is selected from a set of code devices, which set is divided into a plurality of code device types, and further in which said pending exception indicator comprises a flag having an enable state which corresponds to the no pending exception state and which enables the precise exception handling processor to execute a code device of a selected type and a disable condition which corresponds to the pending exception state and which disables the precise exception handling processor from executing a code device of said selected type, the emulation program computer program product providing at least one code device of said selected type which enables the precise exception handling processor to test the flag and, if the flag is in the disable condition, invoke said pending exception processing routine.

24. A emulation program computer program product as defined in claim 23 in which a code device of said selected instruction type comprises a floating point instruction.

25. A emulation program computer program product as defined in claim 19 further comprising a memory for storing information for access by the precise exception handling processor controlled by at least one code device of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the emulation program computer program product providing at least one code device of said selected type which enables the precise exception handling processor to test the access indicator and, if the access indicator is in the no access permitted state, invoke said pending exception processing routine.

26. A emulation program computer program product as defined in claim 25 in which said memory is divided into pages, and in which said at least a portion of said memory comprises a selected one of said pages.

27. A emulation program computer program product as defined in claim 25 in which said at least one code device of a selected type comprises a store instruction which enables the precise exception handling processor to perform a storage operation to store information in said memory.

28. A method of controlling a precise exception handling processor, the precise exception handling processor performing processing operations under control of instructions, the precise exception handling processor being constructed in accordance with a precise exception handling model, in which, if an exception condition is detected in connection with an instruction, the exception condition is processed in connection with the instruction, the precise exception handling processor further being provided with a pending exception indicator having a pending exception indication state and a no pending exception indication state, the method comprising a series of steps, enabled by at least one instruction, for enabling said precise exception handling processor to emulate at least one emulated program instruction, the emulated program instruction being constructed to be processed by a delayed exception handling processor which is constructed in accordance with a delayed exception handling model, in which if an exception is detected during processing of an instruction, the exception condition is processed in connection with a subsequent instruction, the instruction controlling said precise exception handling processor to A. determine whether the pending exception indicator is in the pending exception indication state and, if so, to invoke a routine to process the pending exception and condition the pending exception indicator to said no pending exception indication state;

B. perform a processing operation in accordance with the emulated processing instruction; and C. if an exception condition is detected during said processing operation, to invoke an exception handler in accordance with the precise exception handling processor's precise exception handling model to condition said pending exception indicator to said pending exception indication state, so that the exception condition will be processed during the processing operation for a subsequent emulated program instruction.

29. A method as defined in claim 28, the method further including the step of enabling said precise exception handling processor to, if it determines that the pending exception indicator is in the pending exception indication state, condition the pending exception indicator to the no pending exception indication state.

30. A method as defined in claim 28, in which said emulated program instruction is selected from a set of emulated program instructions which can be processed by said delayed exception handling processor, the set of emulated program instructions being divided into a plurality of types, and further in which the method includes the step of providing the instruction to control the precise exception handling processor as set forth in claim 27 in accordance with an emulated program instruction of a selected emulated program instruction type.

31. A method as defined in claim 30 in which instructions of said selected emulated program instruction type comprise floating point instructions.

32. A method as defined in claim 28, in which the instruction provided to said precise exception handling processor is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the method including the step of providing at least one instruction of said selected type which enables the precise exception handling processor to test the flag and, if the flag is in the disable condition, invoke said pending exception processing routine.

33. A method as defined in claim 32 in which instructions of said selected instruction type comprise floating point instructions.

34. A method as defined in claim 28 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the method including the step of providing at least one instruction of said selected type which enables the precise exception handling processor to test the access indicator and, if the access indicator is in the no access permitted state, invoke said pending exception processing routine.

35. A method as defined in claim 34 in which said memory is divided into pages, and in which said at least a portion of said memory comprises a selected one of said pages.

36. A method as defined in claim 34 in which said at least one instruction of a selected type comprises a store instruction which enables the precise exception handling processor to perform a storage operation to store information in said memory.

37. A translation system for generating, in response to at least one emulated program instruction constructed to be processed by a delayed exception handling processor which is constructed in accordance with a delayed exception handling model, in which if an exception is detected during processing of an instruction, the exception condition is processed in connection with a subsequent instruction, for processing by a precise exception handling processor constructed in accordance with a precise exception handling model in which, if an exception condition is detected in connection with an instruction, the exception condition is processed in connection with the instruction, the precise exception handling processor including a pending exception indicator having a pending exception indication state and a no pending exception indication state, the translation system including a translated program instruction generator for generating, in response to said at least one emulated instruction, at least one instruction for controlling said precise exception handling processor to A. determine whether the pending exception indicator is in the pending exception indication state and, if so, to invoke a pending exception processing routine to process the pending exception;

B. perform a processing operation in accordance with the emulated processing instruction; and C. if an exception condition is detected during the processing operation, to invoke an exception handler in accordance with the precise exception handling processor's precise exception handling model to condition said pending exception indicator to said pending exception indication state, so that the exception condition will be processed during a processing operation for a subsequent emulated program instruction.

38. A translation system as defined in claim 37 in which the at least one instruction further enables said precise exception handling processor to, if it determines that the pending exception indicator is in the pending exception indication state, condition the pending exception indicator to the no pending exception indication state.

39. A translation system as defined in claim 37, in which said emulated program instruction is selected from a set of emulated program instructions which can be processed by said delayed exception handling processor, the set of emulated program instructions being divided into a plurality of types, and further in which the at least one instruction controls the precise exception handling processor as set forth in claim 36 in accordance with an emulated program instruction of a selected emulated program instruction type.

40. A translation system as defined in claim 39 in which instructions of said selected emulated program instruction type comprise floating point instructions.

41. A translation system as defined in claim 37, in which the at least one instruction is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the at least one instruction of said selected type enabling the precise exception handling processor to test the flag and, if the flag is in the disable condition, invoke said pending exception processing routine.

42. A translation system as defined in claim 41 in which instructions of said selected instruction type comprise floating point instructions.

43. A translation system as defined in claim 38 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the at least one instruction of said selected type enabling the precise exception handling processor to test the access indicator and, if the access indicator is in the no access permitted state, invoke said pending exception processing routine.

44. A translation system as defined in claim 43 in which said memory is divided into pages, and in which said at least a portion of said memory comprises a selected one of said pages.

45. A translation system as defined in claim 43 in which said at least one instruction of a selected type comprises a store instruction which enables the precise exception handling processor to perform a storage operation to store information in said memory.

46. A translation system for generating, in response to at least one emulated program instruction constructed to be processed by a delayed exception handling processor which is constructed in accordance with a delayed exception handling model, in which if an exception is detected during processing of an instruction, the exception condition is processed in connection with a subsequent instruction, at least one instruction for processing by a precise exception handling processor constructed in accordance with a precise exception handling model in which, if an exception condition is detected in connection with an instruction, the exception condition is processed in connection with the instruction, the precise exception handling processor including a pending exception indicator having a pending exception indication state and a no pending exception indication state, the translation system including A. a translating processor, and B. a translated program instruction generation control for controlling said translating processor to generate, in response to said at least one emulated instruction, said at least one instruction controlling said precise exception handling processor to i. determine whether the pending exception indicator is in the pending exception indication state and, if so, to invoke a pending exception processing routine to process the pending exception;

ii. perform a processing operation in accordance with the emulated processing instruction; and iii. if an exception condition is detected during the processing operation, to invoke an exception handler in accordance with the processor's precise exception handling model to condition said pending exception indicator to said pending exception indication state, so that the exception condition will be processed during a processing operation for a subsequent emulated program instruction.

47. A translation system as defined in claim 46 in which the translated program instruction generation control further controls said translating processor to generate the at least one instruction to further enable said precise exception handling processor to, if it determines that the pending exception indicator is in the pending exception indication state, condition the pending exception indicator to the no pending exception indication state.

48. A translation system as defined in claim 46, in which said emulated program instruction is selected from a set of emulated program instructions which can be processed by said delayed exception handling processor, the set of emulated program instructions being divided into a plurality of types, and further in which the at least one instruction controls the precise exception handling processor as set forth in claim 45 in accordance with an emulated program instruction of a selected emulated program instruction type.

49. A translation system as defined in claim 48 in which instructions of said selected emulated program instruction type comprise floating point instructions.

50. A translation system as defined in claim 46, in which the at least one instruction is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the at least one instruction of said selected type enabling the precise exception handling processor to test the flag and, if the flag is in the disable condition, invoke said pending exception processing routine.

51. A translation system as defined in claim 50 in which instructions of said selected instruction type comprise floating point instructions.

52. A translation system as defined in claim 46 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the at least one instruction of said selected type enabling the precise exception handling processor to test the access indicator and, if the access indicator is in the no access permitted state, invoke said pending exception processing routine.

53. A translation system as defined in claim 52 in which said memory is divided into pages, and in which said at least a portion of said memory comprises a selected one of said pages.

54. A translation system as defined in claim 52 in which said at least one instruction of a selected type comprises a store instruction which enables the precise exception handling processor to perform a storage operation to store information in said memory.

55. A translated program instruction generation control subsystem for controlling a translating processor to generate, in response to at least one emulated program instruction constructed to be processed by a delayed exception handling processor which is constructed in accordance with a delayed exception handling model, in which if an exception is detected during processing of an instruction, the exception condition is processed in connection with a subsequent instruction, at least one instruction for processing by a precise exception handling processor constructed in accordance with a precise exception handling model in which, if an exception condition is detected in connection with an instruction, the exception condition is processed in connection with the instruction, the precise exception handling processor including a pending exception indicator having a pending exception indication state and a no pending exception indication state, the at least one instruction for controlling said precise exception handling processor to A. determine whether the pending exception indicator is in the pending exception indication state and, if so, to invoke a pending exception processing routine to process the pending exception;

B. perform a processing operation in accordance with the emulated processing instruction; and C. if an exception condition is detected during the processing operation, to invoke an exception handler in accordance with the processor's precise exception handling model to condition said pending exception indicator to said pending exception indication state, so that the exception condition will be processed during a processing operation for a subsequent emulated program instruction.

56. A translated program instruction generation control subsystem as defined in claim 55 further controlling said translating processor to further enable said precise exception handling processor to, if it determines that the pending exception indicator is in the pending exception indication state, condition the pending exception indicator to the no pending exception indication state.

57. A translated program instruction generation control subsystem as defined in claim 55, in which said emulated program instruction is selected from a set of emulated program instructions which can be processed by said delayed exception handling processor, the set of emulated program instructions being divided into a plurality of types, and further in which the at least one instruction controls the precise exception handling processor as set forth in claim 55 in accordance with an emulated program instruction of a selected emulated program instruction type.

58. A translated program instruction generation control subsystem as defined in claim 57 in which instructions of said selected emulated program instruction type comprise floating point instructions.

59. A translated program instruction generation control subsystem as defined in claim 55, in which the at least one instruction is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the at least one instruction of said selected type enabling the precise exception handling processor to test the flag and, if the flag is in the disable condition, invoke said pending exception processing routine.

60. A translated program instruction generation control subsystem as defined in claim 59 in which instructions of said selected instruction type comprise floating point instructions.

61. A translated program instruction generation control subsystem as defined in claim 55 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the at least one instruction of said selected type enabling the precise exception handling processor to test the access indicator and, if the access indicator is in the no access permitted state, invoke said pending exception processing routine.

62. A translated program instruction generation control subsystem as defined in claim 61 in which said memory is divided into pages, and in which said at least a portion of said memory comprises a selected one of said pages.

63. A translated program instruction generation control subsystem as defined in claim 61 in which said at least one instruction of a selected type comprises a store instruction which enables the precise exception handling processor to perform a storage operation to store information in said memory.

64. A translated program instruction generation control computer program product comprising computer readable medium having code device thereon for controlling a translating processor to generate, in response to at least one emulated program instruction constructed to be processed by a delayed exception handling processor which is constructed in accordance with a delayed exception handling model, in which if an exception is detected during processing of an instruction, the exception condition is processed in connection with a subsequent instruction, at least one instruction for processing by a precise exception handling processor constructed in accordance with a precise exception handling model in which, if an exception condition is detected in connection with an instruction, the exception condition is processed in connection with the instruction, the precise exception handling processor including a pending exception indicator having a pending exception indication state and a no pending exception indication state, the at least one instruction controlling said precise exception handling processor to A. determine whether the pending exception indicator is in the pending exception indication state and, if so, to invoke a pending exception processing routine to process the pending exception;

B. perform a processing operation in accordance with the emulated processing instruction; and C. if an exception condition is detected during the processing operation, to invoke an exception handler in accordance with the processor's precise exception handling model to condition said pending exception indicator to said pending exception indication state, so that the exception condition will be processed during a processing operation for a subsequent emulated program instruction.

65. A translated program instruction generation control computer program product as defined in claim 64 further comprises code devices for controlling said translating processor to generate the at least one instruction to further enable said precise exception handling processor to, if it determines that the pending exception indicator is in the pending exception indication state, condition the pending exception indicator to the no pending exception indication state.

66. A translated program instruction generation control computer program product as defined in claim 64, in which said emulated program instruction is selected from a set of emulated program instructions which can be processed by said delayed exception handling processor, the set of emulated program instructions being divided into a plurality of types, and further in which the at least one instruction controls the precise exception handling processor as set forth in claim 64 in accordance with an emulated program instruction of a selected emulated program instruction type.

67. A translated program instruction generation control computer program product as defined in claim 66 in which instructions of said selected emulated program instruction type comprise floating point instructions.

68. A translated program instruction generation control computer program product as defined in claim 64, in which the at least one instruction is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the at least one instruction of said selected type enabling the precise exception handling processor to test the flag and, if the flag is in the disable condition, invoke said pending exception processing routine.

69. A translated program instruction generation control computer program product as defined in claim 68 in which instructions of said selected instruction type comprise floating point instructions.

70. A translated program instruction generation control computer program product as defined in claim 64 further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the at least one instruction of said selected type enabling the precise exception handling processor to test the access indicator and, if the access indicator is in the no access permitted state, invoke said pending exception processing routine.

71. A translated program instruction generation control computer program product as defined in claim 70 in which said memory is divided into pages, and in which said at least a portion of said memory comprises a selected one of said pages.

72. A translated program instruction generation control computer program product as defined in claim 70 in which said at least one instruction of a selected type comprises a store instruction which enables the precise exception handling processor to perform a storage operation to store information in said memory.

73. A translation method for controlling a translating processor to generating, in response to at least one emulated program instruction constructed to be processed by a delayed exception handling processor which is constructed in accordance with a delayed exception handling model in which if an exception is detected during processing of an instruction, the exception condition is processed in connection with a subsequent instruction, at least one instruction for processing by a precise exception handling processor constructed in accordance with a precise exception handling model in which, if an exception condition is detected in connection with an instruction, the exception condition is processed in connection with the instruction, the processor including a pending exception indicator having a pending exception indication state and a no pending exception indication state, the translation method enabling said translating processor to generate, in response to said at least one emulated instruction, said at least one instruction controlling said precise exception handling processor to perform the steps of A. retrieving said at least one emulated program instruction; and
B. generating said instruction for controlling said precise exception handling processor to
 i. determine whether the pending exception indicator is in the pending exception indication state and, if so, to invoke a pending exception processing routine to process the pending exception;
 ii. perform a processing operation in accordance with the emulated processing instruction; and
 ii. if an exception condition is detected during the processing operation, to invoke an exception handler in accordance with the processor's precise exception handling model to condition said pending exception indicator to said pending exception indication state, so that the exception condition will be processed during a processing operation for a subsequent emulated program instruction.

74. A translation method as defined in claim 73 in which the at least one instruction further enables said precise exception handling processor to, if it determines that the pending exception indicator is in the pending exception indication state, condition the pending exception indicator to the no pending exception indication state.

75. A translation method as defined in claim 73, in which said emulated program instruction is selected from a set of emulated program instructions which can be processed by said delayed exception handling processor, the set of emulated program instructions being divided into a plurality of types, and further in which the at least one instruction controls the precise exception handling processor as set forth in claim 73 in accordance with an emulated program instruction of a selected emulated program instruction type.

76. A translation method as defined in claim 75 in which instructions of said selected emulated program instruction type comprise floating point instructions.

77. A translation method as defined in claim 73, in which the at least one instruction is selected from a set of instructions, which set is divided into a plurality of instruction types, and further in which said pending exception indicator comprises a flag having an enable state which corresponds to the no pending exception state and which enables the precise exception handling processor to execute instructions of a selected type and a disable condition which corresponds to the pending exception state and which disables the precise exception handling processor from executing instructions of said selected type, the at least one instruction of said selected type enabling the precise exception handling processor to test the flag and, if the flag is in the disable condition, invoke said pending exception processing routine.

78. A translation method as defined in claim 75 in which instructions of said selected emulated program instruction type comprise floating point instructions.

79. A translation method as defined in claim 77, the precise exception handling processor further comprising a memory for storing information for access by the precise exception handling processor controlled by at least one instruction of a selected type, access to at least a portion of said memory being controllable in response to an access indicator having an access permitted state and a no access permitted state, the access indicator corresponding to the pending exception indicator such that the access permitted state corresponds to the no pending exception state and the no access permitted state corresponds to the pending exception state, the at least one instruction of said selected type enabling the precise exception handling processor to test the access indicator and, if the access indicator is in the no access permitted state, invoke said pending exception processing routine.

80. A translation method as defined in claim 79 in which said memory is divided into pages, and in which said at least a portion of said memory comprises a selected one of said pages.

81. A translation method as defined in claim 79 in which said at least one instruction of a selected type comprises a store instruction which enables the precise exception handling processor to perform a storage operation to store information in said memory.

82. A method of controlling a precise exception handling processor, the precise exception handling processor performing processing operations under control of instructions, the precise exception handling processor being constructed in accordance with a precise exception handling model, in which, if an exception condition is detected in connection with an instruction, the exception condition is processed in connection with the instruction, the precise exception handling processor further being provided with a pending exception indicator having a pending exception indication state and a no pending exception indication state, the method comprising a series of steps, enabled by at least one instruction, of A. enabling said precise exception handling processor to determine whether the pending exception indicator is in the pending exception indication state and, if so, to invoke a routine to process the pending exception and condition the pending exception indicator to said no pending exception indication state;
B. enabling said precise exception handling processor to perform a processing operation in accordance with the emulated processing instruction; and
C. enabling said precise exception handling processor, if an exception condition is detected during said processing operation, to invoke an exception handler in accordance with the precise exception handling processor's precise exception handling model to condition said pending exception indicator to said pending exception indication state, so that the exception condition will be processed during the processing operation for a subsequent emulated program instruction.

83. A method as defined in claim 82 in which said at least one instruction enables said precise exception handling processor to emulate an emulated program instruction, the emulated program instruction being constructed to be processed by a delayed exception handling processor which is constructed in accordance with a delayed exception handling model, in which if an exception is detected during processing of an instruction, the exception condition is processed in connection with a subsequent instruction.

* * * * *